Dec. 13, 1960 D. F. SAMHAMMER ET AL 2,964,305
CRUST BREAKING APPARATUS
Filed Nov. 20, 1958 5 Sheets-Sheet 1

INVENTORS:
DONALD F. SAMHAMMER,
RICHARD E. HOOPER.
BY
Raymond G. Mullee
ATTORNEY

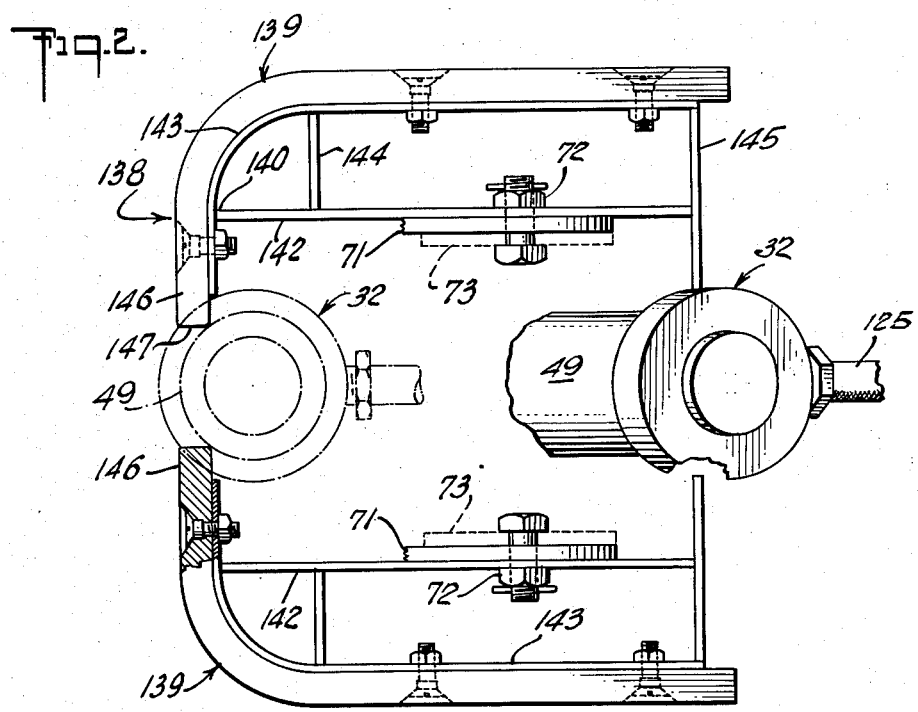
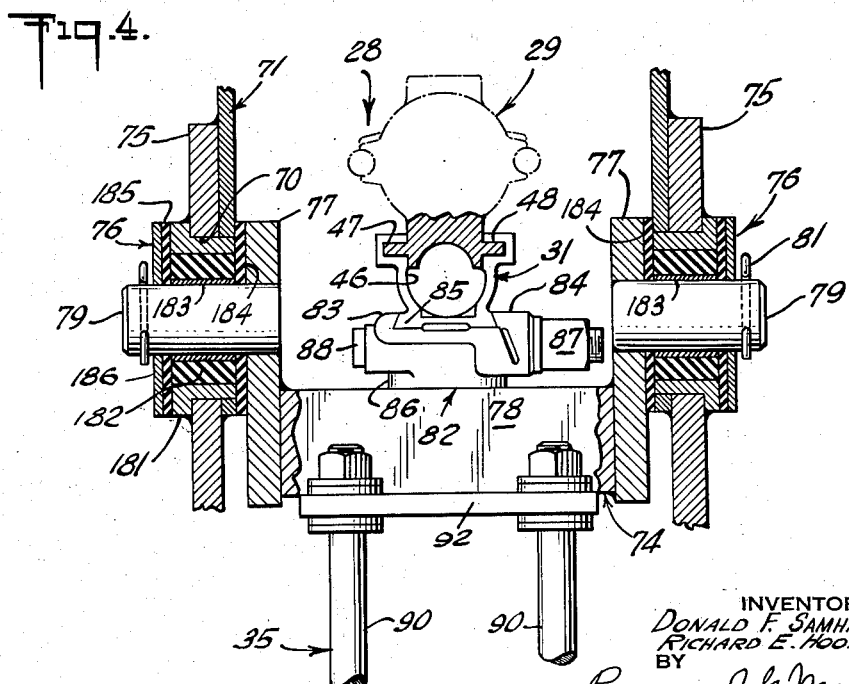

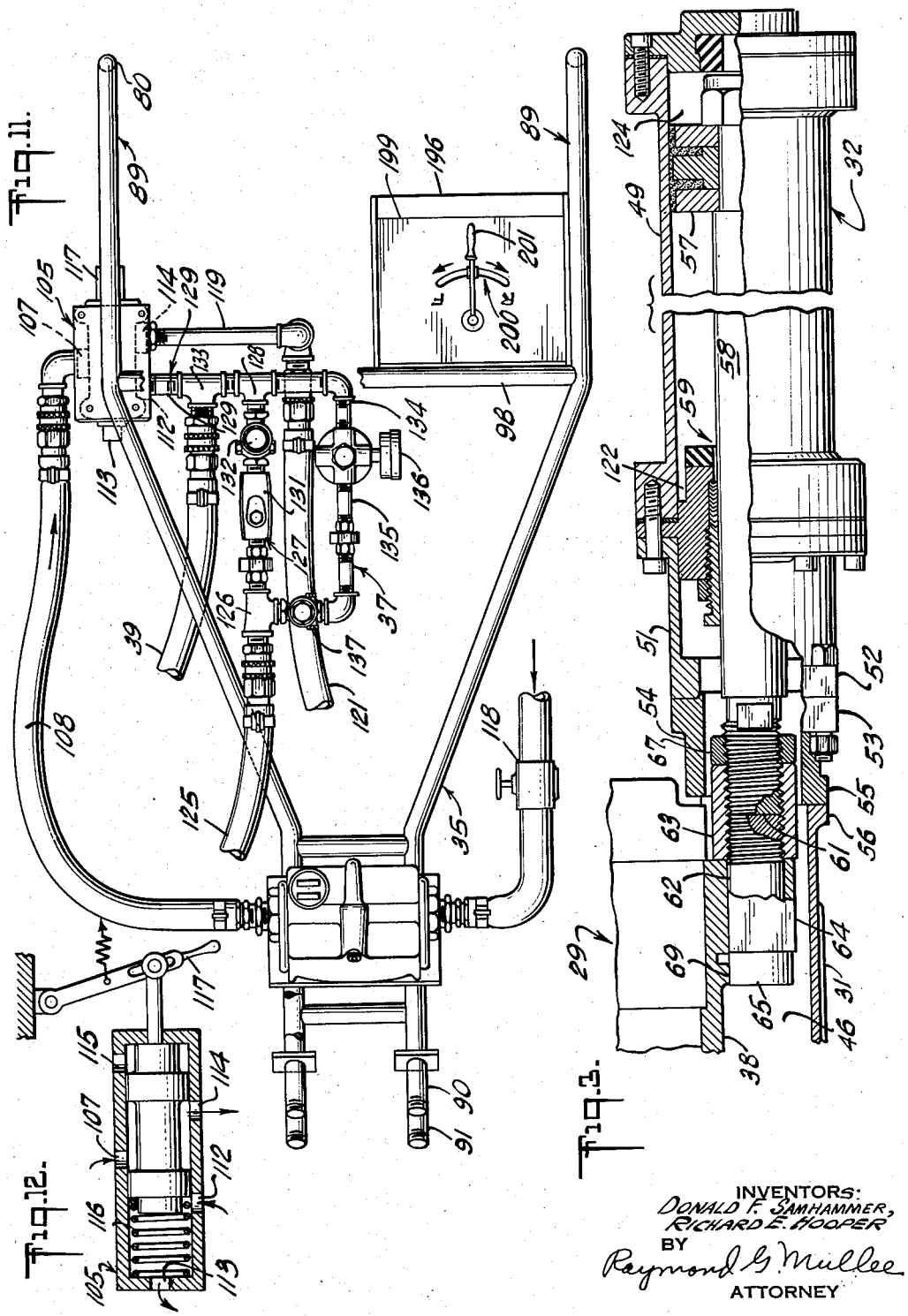

Dec. 13, 1960 D. F. SAMHAMMER ET AL 2,964,305
CRUST BREAKING APPARATUS
Filed Nov. 20, 1958 5 Sheets-Sheet 4
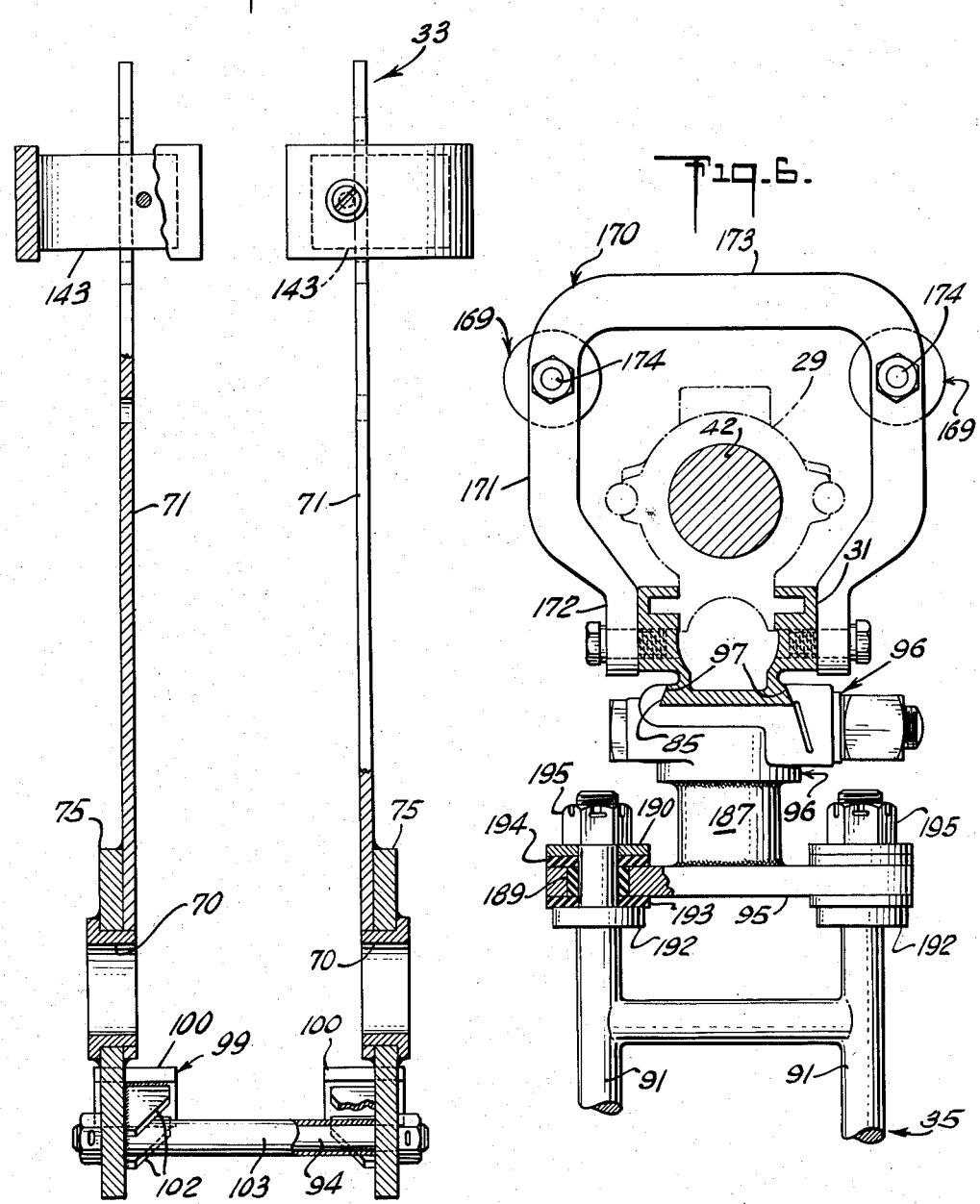
INVENTORS:
DONALD F. SAMHAMMER,
RICHARD E. HOOPER
BY Raymond G. Mullee
ATTORNEY Dec. 13, 1960 D. F. SAMHAMMER ET AL 2,964,305
CRUST BREAKING APPARATUS
Filed Nov. 20, 1958 5 Sheets-Sheet 5
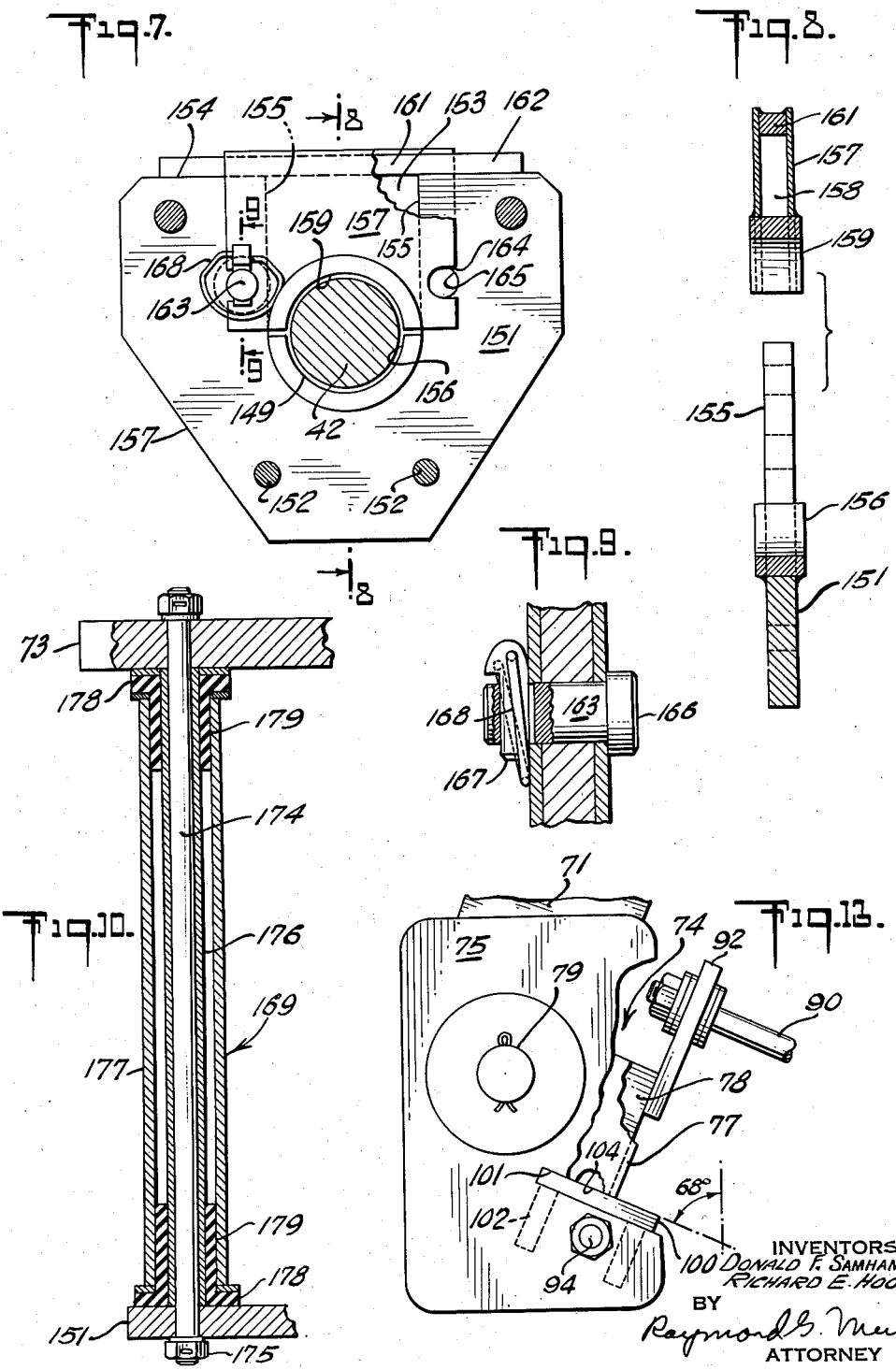
INVENTORS:
DONALD F. SAMHAMMER,
RICHARD E. HOOPER
BY
Raymond G. Mullee
ATTORNEY

United States Patent Office 2,964,305
Patented Dec. 13, 1960

2,964,305

CRUST BREAKING APPARATUS

Donald F. Samhammer and Richard E. Hooper, Utica, N.Y., assignors to Chicago Pneumatic Tool Company, New York, N.Y., a corporation of New Jersey Filed Nov. 20, 1958, Ser. No. 775,239

15 Claims. (Cl. 262—13)

This invention is concerned with apparatus for breaking up the thick hard crust that forms over the electrolyte in a cell pot during the electrolytic process of extracting aluminum from raw materials. It becomes necessary from time to time to break up this crust, a principal reason being so as to provide an opening through which the electrolyte may be replenished with raw materials.

The apparatus of the present invention is subject to various industrial applications, but it is particularly suited for use in crust breaking operations in aluminum extracting plants.

A general object of the invention is to provide crust breaking apparatus of an improved and practical construction, which materially reduces the usual difficulties and problems associated with crust breaking operations.

A feature of the invention is a balanced arrangement of a pneumatically powered work unit for breaking up the crust of a cell pot, which may be handled and controlled by the operator without appreciable effort.

A further feature of the invention lies in structure for materially damping the vibration of the apparatus, and as a consequence, materially reducing the transmission of vibration to the operator.

Another feature of the invention lies in an insulated arrangement of various elements of the apparatus which materially reduces the danger of electrical shock being transmitted to the operator when accidental electrical contacts are made by the apparatus with the electrodes of an associated cell pot.

A further feature of the invention is electrically insulated guard means which serves to guard the work unit of the apparatus from accidental contact with electrical elements of the cell pot; this avoids possible arcing and consequent damage to the work unit. This guard means also serves to guard the anode of the cell pot from being contacted by the steel shank of the work unit and possibly damaged during the operations of the latter.

A further feature of the invention lies in a combined hanger and trolley arrangement which supports the work unit of the apparatus for pivotal and horizontal movements in relation to the crust of the cell pot to be acted upon.

A further feature of the invention lies in certain stop means which limits the pivoting of the work unit to an efficient range relative to the crust, and thus avoids unnecessary movement of the work unit and consequent dangers to the apparatus.

A feature of this stop means is an abutment upon which the work unit may be rested at the angle in which it is operated most of the time, and may be so retained without appreciable effort on the part of the operator.

A still further feature of the invention lies in a handle attachment which permits operation of the work unit by the operator at a reasonably safe distance and also serves to support within reach of the operator various controls for operating and maneuvering the work unit.

Accordingly, a further object of this invention is to provide practical crust breaking apparatus incorporating the various features above.

The invention further lies in the particular structure and novel arrangement of its various components, as well as in their cooperative association with one another to effect the results intended herein.

The foregoing and other objects and advantages of this invention will appear more fully hereinafter from a consideration of the detailed description which follows, taken together with the accompanying drawings wherein an embodiment of the invention is illustrated. It is to be expressly understood, however, that the drawings are for purposes of illustration and description, and they are not to be construed as defining the limits of the invention.

In the drawings:

Fig. 2 is a section taken on line 2—2 of Fig. 1;

Fig. 3 is a detail of the association of the piston feed cylinder with the shell and with the crust breaker;

Fig. 4 is a section taken on line 4—4 of Fig. 1;

Fig. 5 is a detail of the hanger structure;

Fig. 6 is a section taken on line 6—6 of Fig. 1;

Fig. 7 is a section on line 7—7 of Fig. 1, and is directed to the centralizer;

Fig. 8 is a section on line 8—8 of Fig. 7, and shows the parts thereof in separated condition;

Fig. 9 is a section on line 9—9 of Fig. 7 detailing the connection of the slide member of the centralizer with the base plate of the latter;

Fig. 10 is a longitudinal section through one of the guard elements;

Fig. 11 is a plan detail of the handle;

Fig. 12 is a schematic showing of the control valve; and

Fig. 13 is an enlarged fragmentary detail in elevation showing the cross block of the swivel limited upon the stop means in the normal clockwise limited position of the work unit.

Figure 1:
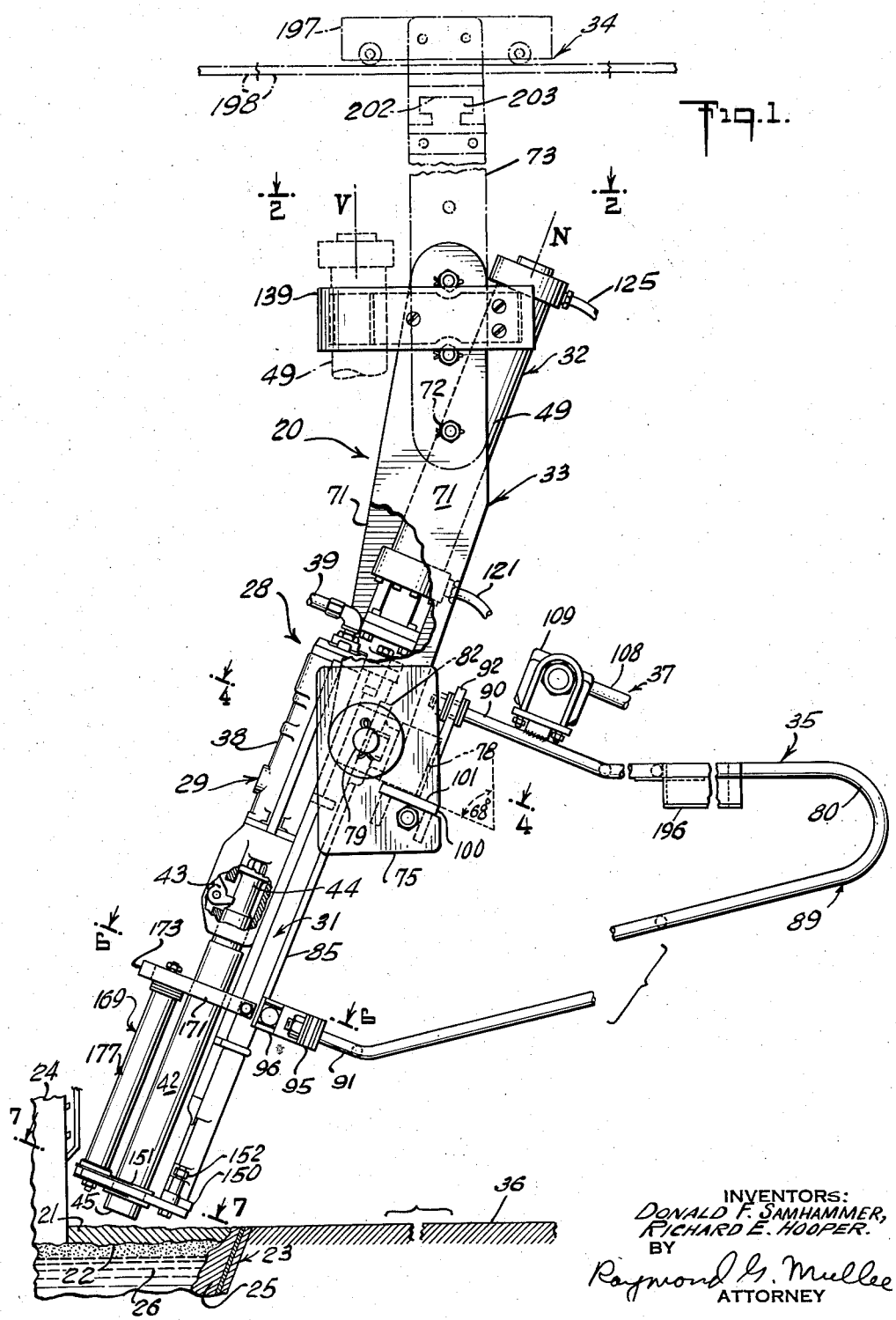
Fig. 1 is a side elevational view of crust breaking apparatus embodying the invention.

Reference is directed to the drawings, and now particularly to Figs. 1 and 11, wherein there is shown a pneumatically powered crust breaking apparatus 20, the function of which is to break away the thick hard crust 21 that forms over the electrolyte 22 in a cell pot 23 (schematically illustrated) during the electrolytic process of extracting aluminum from raw materials. In the extraction process, a very high amperage current is passed from an anode 24 through the electrolyte 22 to a cathode 25, whereupon aluminum is melted or dissolved out of the electrolyte and settles at the bottom of the cell pot, as at 26. At regular intervals, the molten aluminum is siphoned off, and the electrolyte is recharged with fresh materials. To do the latter, it is necessary that the thick hard crust 21 formed over the electrolyte and about the anode 24 of the cell pot be broken away so as to provide an opening for admitting fresh materials to the electrolyte.

The apparatus 20 includes a work unit 28 comprising a pneumatically powered crust breaker member 29 mounted for slidable travel along an elongated guide shell 31, and a pneumatically powered feed means 32 axially mounted to an end of the shell and associated with the crust breaker 29 for effecting direct feed of the latter along the shell to and from the work, or crust 21. The work unit 28 is pivotally supported in a hanger 33 which is adapted to be suspended from an overhead trolley or carriage system 34 whereby the work unit may be carried in a horizontal direction to a desired position above the crust of the cell pot. A long handle 35 is associated with the work unit for manipulation by an operator standing on the floor 36 at a safe distance from the cell pot. By means of the handle, the work unit may be angularly pivoted in the hanger in a vertical plane to a desired angular position relative to the crust below. A pneumatic supply control system 37 (Fig. 11) for effecting operation of the crust breaker 29 and of the feed means 32 is supported upon the handle for easy access thereto and manipulation by the operator. Various safeguards, as will be later described, are provided as components of the apparatus for protection of both the operator and the apparatus against injury and damage that might otherwise occur from the hazards of the operations involved and the associated high current of the cell pot.

The crust breaker 29 is of conventional structure. It includes an elongated housing 38 into the interior of which pneumatic power is supplied from the control system 37 over a hose line 39 to effect in the conventional manner of well known pneumatic tools of the percussive piston hammer type, such as the well known pavement breaker, rapid reciprocation of a piston hammer, not shown, to impart a succession of powerful impacts to a steel shank or tool 42. Suitable retainer means, illustrated at 43, supported in the housing and cooperating with a short longitudinal well 44 in the head end of the shank prevents escape of the shank from the housing and limits the distance the shank may be slidably extended out of the housing. The shank 42 is relatively thick, and preferably has a broad flat work end 45. This broad flat end serves not only to crack and break up the crust, but also avoids sudden thrusts through the crust as might otherwise occur. The shell 31 is substantially semi-circular in cross section, having a cavity or trough 46 (Figs. 3 and 4) which opens longitudinally of the front of the shell. A pair of longitudinally extending grooves 47 in opposed inner marginal wall areas of the shell define a trackway in which complementary ribs 48 longitudinally of opposite sides of the underside of the housing of the crust breaker 29 are slidably engaged, whereby the crust breaker is enabled to slide along the shell.

The feed means 32 (Figs. 1 and 3) for effecting movement of the crust breaker along the shell includes an elongated piston feed cylinder 49 having an adapter 51 axially mounted to its bottom. A flange 52 at the bottom of the adapter is bolted to a complementary flange 53 at one end of a coupling 54. A flange 55 at the opposite end of the coupling is bolted to a complementary flange 56 at the top or right end of the shell 31. By means of the coupling 54, the shell 31 and cylinder 49 are associated in longitudinal or axial extension of each other.

In the cylinder 49 is a piston 57 carrying an elongated piston rod 58 which is axially slidable through packing means 59 closing over the bottom end of the cylinder. The piston rod is freely extendible axially through the adapter 51, the coupling 54, and through an opening in the top end of the shell into the trough 46 of the latter. The free end 61 of the piston rod is axially coupled by means of a bolt 62 and a sleeve nut 63 to an oblong lug 64 that is formed on the underside of the housing of the crust breaker 29 and dips radially and freely into the trough of the shell. The head end 65 of the bolt limits against the left end face of the lug, and the shank of the bolt projects axially through a hole in the lug so as to abut its free end axially against the free end of the piston rod 58. The bolt and the piston rod are threaded at their adjoining end portions. These threaded portions are coupled together by the sleeve nut 63 which is threaded into abutment with the right end face of the lug. A jam nut 67 jammed against the sleeve nut locks the latter from working loose under vibration of the apparatus. It is to be noted that the head 65 of bolt 62 has a flat 68 thereon which is in flush contact with a complementary flat undersurface of the housing 38 of the crust breaker, whereby the bolt is prevented from turning loose under vibration of the apparatus. In this arrangement, as piston 57 moves forwardly in its cylinder, the crust breaker 29 is caused by means of the lug connection with the piston rod to ride down the shell 31 toward the crust 21 of the cell pot; and a return movement of the piston draws the crust breaker away from the crust.

The hanger 33 (Figs. 1, 2 and 5) which supports the work unit 28 includes a pair of vertically disposed elongated plates 71 arranged in opposed parallel spaced relation. The upper end areas of these plates include a plurality of holes accommodating nut and bolt elements 72 whereby the plates are adapted to be rigidly bolted to and suspended from depending arms 73 of the trolley system 34. Supported between the lower ends of the hanger plates 71 is a swivel 74 on which the work unit 28 is mounted. A pair of relatively thick side plates 75 are arranged in opposed parallel spaced relation to each other and are welded fast, one to the outer face or side of each hanger plate. These side plates serve to strengthen the hanger plates, and also provide openings 70 having broad supporting surfaces to accommodate bearing elements 76 supporting the swivel 74.

The swivel (Figs. 1 and 4) includes a pair of parallel rectangular arm plates 77 welded fast at their rear inner areas to opposite ends of a cross block 78. Projecting at right angles from the outer faces of the arm plates 77 in parallel spaced relation to the cross block and forwardly thereof is a pair of axially aligned thick pivot pins 79. The inner ends of the latter are embedded fast in the arm plates 77. Each pivot pin is supported for rotation in a bearing element 76 carried by the hanger. Cotter pins 81 engaged in projecting ends of the pivot pins retain the latter in the bearing elements against endwise movement.

The cross block 78 supports centrally of its forward or inner face a clamp 82 having a pair of jaws 83, 84 between which a tongue 85 along the underside of the shell 31 is rigidly gripped. The jaw designated 83 has a neck 86 at its rear fixed to the inner face of the cross block; the other jaw 84 is adapted to be drawn toward the fixed jaw by means of a nut 87 threadable upon the shank end of a headed bolt 88 which passes through both jaws.

The tongue 85 extends a substantial distance along the underside of the shell. It is gripped by the clamp near the upper end of the shell so that the portions of the work unit extending above and below the pivot pins are about equal in length. It is to be further noted that the neck 86 at the rear of the fixed jaw 83 spaces the clamp forwardly from the cross block so that the jaws of the clamp are substantially intersected by the axis of rotation of the pivot pins. This arrangement serves to more evenly spread the load of the work unit 28 over the pivot pins and the clamp, thus increasing the balance of the work unit upon the pivot pins.

The swivel 74 enables the work unit to be easily pivoted or tilted in a vertical plane so as to locate the steel shank 42 in a desired angular position relative to the crust 21. The handle 35 is provided to enable the operator to manually tilt the work unit 28, as desired relative to the crust.

The handle 35 (Figs. 1, 4, 6 and 11) comprises a pair of laterally spaced bars 89, each substantially of elongated V configuration and turned on its side so that the vertex end 80 thereof is away from the work unit. The vertex ends of the bars are desirably rounded, to permit them to be comfortably gripped by the operator. The upper arms 90 of the handle are fastened at their free ends to the upper part of an upright extension piece 92 the lower area of which is welded fast to the rear face of cross block 78. The lower arms 91 of the handle are fastened to a cross piece 95. The latter has fixed to its forward face a clamp 96 which grips between its jaws 97 a lower part of the tongue 85 of shell 31 at a point located a short distance above the bottom end of the latter. The handle bars 89 are maintained in spaced relation to each other by a plurality of cross pieces, as at 98, fixed between them.

The work unit 28, together with the swivel 74, the associated handle 35 and the pneumatic supply system 37, forms a complete pivotable assembly which pivots in the hanger 33, and has a substantially balanced condition therein. The center of gravity of this complete assembly is adjustable relative to the pivot point thereof by longitudinally adjusting the position of the work unit 28 in the clamps elements 82, 96. Here, the adjustment is such that the center of gravity is near the pivot point and slightly to the handle side thereof, so that the complete assembly is overweighted to the handle side when in a vertical position and tends to pivot from the vertical to the handle side, which is clockwise in Fig. 1.

Stop means 99 (Figs. 1, 4, 5 and 13) carried by the inner faces of the side plates 75 of the hanger cooperates with the cross block 78 of the swivel to limit the extent of clockwise directional movement of the work unit 28 to a desired inclined normal position. A large part of the work operation is done while the work unit is supported by the stop means in this normal position; and, because of the stop means, the work unit may be maintained in this position without appreciable effort on the part of the operator.

The stop means comprises a pair of laterally spaced and aligned flat stop plates 100. Each of these has its outer end fixed in a complementary slot 101 cut deeply into the rear edge of a related side plate 75 of the hanger at a slight angle declining rearwardly. This angle relative to vertical is desirably about 68°. A separate pair of trusses 102 welded to the underside of each stop plate and to the adjacent side plate 75 strengthen the stop plates. A cross-bolt 94 retained at its ends in the side plates of the hanger, together with a spacer 103 sleeving the bolt, serves to prevent the side plates from spreading laterally apart. When the work unit 28 is limited in its normal position, a flat underside 104 of the cross block 78 as well as the underside portions of the swivel arm plates 77 rest flat upon the upper flat surfaces of the stop plates 100 as in Figs. 1 and 13.

It is to be noted (Fig. 11) that the handle bars 89 are spaced relatively close at their attaching ends because of the relative narrow nature of the work unit 28; but are spread apart at their vertex ends 80 so as to enable the operator to stand freely between them.

The pneumatic supply control system 37 (Figs. 1, 11, and 12) which is supported on the handle bars, includes an air flow distributor or control valve device 105 of conventional design which is mounted to the handle near the vertex end of one of the handle bars. The control valve device 105 is schematically shown in Fig. 12. It includes a valve chamber having a supply inlet port 107 connected through a main supply line 108 to a suitable source of pressure air, not shown. A conventional line oiler 109 supported upon the forward ends of the handle bars is interposed in the main supply line. A two position slide valve 111 works in the valve chamber. It has a cut-off normal or return position, and an operating or forward reverse position. In its normal or cut-off position, as in Fig. 12 it connects an outlet port 112 to an exhaust vent 113, and connects a second outlet port 114 to the inlet port 107. In its operating forward or reverse position, it connects port 114 to an exhaust vent 115, and connects port 112 to the inlet 107. The valve is continuously under the load of a spring 116 urging it axially to normal cut-off position. It is operable by an attached deadman lever 117 having a forward position, and a spring loaded return position. The lever is manually moved to its forward position, and when it is relaxed, it returns automatically under the spring load 116, 110.

In the operation of the control system 37 (Figs. 1, 3, 11, 12), after a main valve 118 in the supply line is turned "on," pressure air flows through the inlet 107 of the control device 105. Assuming the control valve 111 to be in its normal position, as in Fig. 12, pressure air then flows through port 114 into a short rigid pipe 119 and a connected hose line 121 to the return end 122 of the cylinder 49, causing the piston 57 therein to move or return upward, if it has not already been returned, and as a consequence causing the crust breaker 29 to be drawn upward along the shell 31 away from the crust 21 of the cell pot. As the piston returns, air trapped at the feed end 124 of the cylinder is forced over a hose line 125 through a connected T fitting 126 and over a short return line 127 and a tap 128 into a manifold pipe 129 from where it enters port 112 and escapes through the vent 113. The diameter of the short return line 127 is narrower than that of the associated hose line 125 whereby the flow is choked, and as a consequence, the return of the piston is cushioned. This avoids slamming, as well as too rapid a return of the piston. A settable valve 131 in the short return line is further provided to choke or restrict the return flow as desired. A one way check valve 132 between the manifold tap 128 and valve 131 blocks any opposite flow from the manifold into the short line 127.

If the control valve 111 is next moved to its operating forward or reverse position, the return end 122 of the cylinder is connected by the control valve to the vent 115 over hose line 121, pipe 119 and port 114; and operating air flows through port 112 into the manifold pipe 129. From the latter it is distributed simultaneously out of taps 133 and 134. Hose line 39 connected to tap 133 carries the pressure air to operate the crust breaker. Tap 134 connects with a short by-pass line 135 which by-passes the short return line 127 and connects through the T fitting 126 with the hose line 125 that leads to the feed end 124 of the cylinder. This causes the crust breaker 29 to feed along the shell 31 toward the crust 21 and, upon contacting the crust, to press against it while the crust breaker operates.

The by-pass line 135 is restricted and of smaller diameter than the hose line 39 leading to the crust breaker. This is desired as it permits a relatively greater flow to the crust breaker according to its needs, and a restricted flow to meet the limited requirements of the feed end 124 of the piston cylinder. A manually regulated flow control valve 136 in the by-pass line enables the operator to further restrict as needed the flow to the feed end of the cylinder. A one-way check valve 137 in the by-pass line blocks return air flow over the hose line 125 from entering the by-pass line.

When the crust 21 cracks and gives way to the steel shank 42, the operator may immediately release his hold on the deadman lever 117, whereupon the control valve 111 will immediately return under its spring load to normal position. Following the latter action, the operating air flow to the crust breaker stops, and piston 57 draws the crust breaker away from the crust, as earlier explained.

Buffer means (Figs. 1, 2 and 5) is provided for curbing or damping the vibration of the apparatus. This includes a pair of buffer elements 139 mounted one to each of the hanger plates 71. The buffer elements are in opposed parallel relation, and are aligned so as to balance one another. Each buffer element includes a supporting frame having an inner plate 142 mounted flat to the outer face of a related hanger plate 71. The buffer element is mounted near the top of the latter and extends transversely beyond the longitudinal edges of the hanger plate. An outer frame plate 143 is fixed across the outer edges of a pair of struts 144, 145 extending at right angles from the inner plate 142. A forward end of the outer plate 143 extends beyond strut 144 and curves inwardly over and beyond the forward end 140 of the inner plate. The outer plate 143 is fixed to the inner plate 142 at the point 140 of crossing. Each supporting frame of the buffer elements is weighted by a thick heavy backing member or pad 146 which is bolted fast to the back of the outer frame plate 143. The balanced arrangement of the buffer elements and the spaced relation of the heavy backing pads 146 serves to dampen the vibration of the apparatus.

The buffer elements 139 also serve as stops to limit the extent of counterclockwise pivoting (Fig. 1) of the work unit 28 from its normal angular position to a substantially vertical position. To this end, the free forward end portions 147 of the buffer pads 146 extend laterally into the path of counterclockwise movement of the cylinder 49 and are positioned forwardly relative to the pivot pins 79 sufficiently to stop the cylinder in its counterclockwise movement to a substantially vertical position, as indicated by the broken line in Fig. 1.

It is to be noted that the operational arc V—N of the work unit from its vertical to its normal angular position is advantageously short, being less than 45°. This permits the crust breaker to efficiently cover the crust area over which the work is to be done and, because of the hazards of the work involved, avoids unnecessary and undesirable tilting of the crust breaker.

A further feature of the invention is provided by the structure and advantages of a centralizer (Figs. 1 and 7–9) associated with the steel shank 42 for centering the latter. The centralizer is also designed to permit easy and quick assembly of the steel shank in a lateral direction into a hole 149 of the centralizer. This is desired, because the relatively close position that the apparatus has to the floor 36 and the crust 21 when suspended from the trolley 34, makes vertical insertion or removal of the shank into the crust breaker through the bottom of the centralizer hole 149 difficult. The centralizer includes a base plate 151 extending forwardly from the shell 31. This plate lies in a plane at right angles to the shell and to the steel shank. The rear marginal surface area of the base plate is fastened by a pair of bolts 152 to the underside of a bottom flange 150 of the shell. Centrally of the base plate is an enlarged cut-out 153 which opens through a straight forward edge 154 of the base plate. The sides 155 of the cut-out are at right angles to the straight edge 154 and tangent to a thickened semi-circular rear wall 156 of the cut-out. This semi-circular wall defines one-half of the centralizer hole. A slide plate member 157 complements the cut-out. It is slidable into the cut-out from the forward end of the latter by means of open sides 158 thereof which sleeve over or receive marginal portions of the corresponding sides 155 of the cut-out. A thickened wall 159 of a semi-circular cut-out in the slide member complements that in the base plate to define a collar for the centralizer hole. A stop bar 161 fixed transversely of the rear end of the slide member 157 has extended portions 162 which abut the forward edge 154 of the base plate when the slide member is fully entered into the cut-out 153.

The slide member 157 is retained in position by a pair of readily removable retainer pins 163, one being omitted for convenience of illustration. Each of the latter is insertable through a side notch 164 in the slide member and through a registered hole 165 in the base plate. A head 166 at one end of the retainer pin, and a removable slip pin 167 in the opposite end prevents escape of the retainer pin. A latch spring 168 on the slip pin prevents escape of the latter.

In this structure of the centralizer, it is clear that the slide member 157 may be readily removed to permit easy removal or insertion of the steel shank 42 into the crust breaker. In the latter respect, the steel shank is entered laterally into the cut-out 153 of the base plate, and is next elevated a short distance in to the crust breaker. The slide member 157 and the retaining pins 163 are then replaced, thus centralizing the steel shank in the centralizer hole 149.

A further feature of the invention is provided by a pair of guard elements 169 (Figs. 1, 6, 7 and 10) whereby the steel shank 42 is guarded against coming into contact with the electrically charged anode member 24 of the cell pot. Contact of the steel shank with the anode may damage the latter and also cause undesirable arcing.

The guard elements are supported at one end by the base plate 151, and at the other by a yoke or C member 170. The arms 171 of this yoke pass freely about the upper exposed end of the steel shank, and the free ends 172 thereof are bolted fast to opposite sides of the guide shell 31. A bridge 173 of the yoke overhangs the forward area of the base plate 151 of the centralizer below. A pair of vertical rods 174 of the guard elements are spaced forwardly and clear of the steel shank, and are retained at their ends to the arms 171 of the yoke and to the base plate 151 by nut elements 175. An inner spacer element 176 sleeves over each rod. Freely surrounding the spacer element is a relatively thick cylinder shield 177 of hard material. A bushing 178 of electrical insulation material separates each end of the shield from the corresponding adjacent portions of the bridge and the base plate. Each bushing has an elongated sleeve portion 179 which spaces the shield from the inner sleeve. The bushing serves to electrically insulate the shield from the bridge and base plate, so that charges arising from accidental electrical contact of the shield with projecting portions of the anode 24 are not transmitted to the apparatus generally, nor to the operator. The forwardly spaced relation of the guard elements 169 to the steel shank 42 also serves to protect the steel shank from coming into damaging percussive contact with the anode 24 which projects up from the electrolyte through the crust. The guard elements 169 are located at opposite sides of the cut-out 153 of the base plate so as not to block the entrance to the cut-out.

A further advantage of the centralizer is provided because of its particular structure. It is noted that the base plate 151 of the centralizer is substantially rectangular, being slightly narrowed at its rear. It thus provides a broad flat undersurface surrounding the steel shank. This is of advantage in preventing pieces of the broken crust 21 from rising up and becoming jammed between the steel shank and the shell. It also protects the apparatus from being possibly splashed with molten aluminum upon breaking away of the crust.

Further safety features are provided in the apparatus to insulate the handle 35 from the work unit 28 against any electrical charges that may possibly arise in the latter. To this end (Figs. 1 and 4), each pivot bearing element 76 includes a bearing retainer or bushing 181 which is welded fast in the opening 70 of the related hanger and side plates 71, 75. Fitted in this retainer is a thick ring 182 of electrical insulation material, the inner wall of which is lined by a bearing sleeve 183 in which the related pivot pin 79 rotates. The swivel arm plate 77 is electrically insulated from the associated hanger parts and the bearing retainer 181 by an insulation washer 184. A similar protective washer 185 is located on the external end of the pivot pin between the outer face of the bearing retainer and a metal washer 186. The latter protects the insulation washer 185 from damage by the cotter pin 81 as the pivot pin rotates.

The connections of the lower and upper free ends 91 and 90 of the handle bars are also electrically insulated as a further measure of protection to the operator. In this respect (Figs. 1, 4 and 6), the lower handle clamp 96 has a rearwardly extending neck 187 transversely of which is carried the cross piece 95. The latter has a pair of enlarged holes in its end portions in each of which is fitted a rubber bushing 189. Each of the free ends 91 of the lower handle bars passes through one of the bushings. Stops 192 fixed adjacent the free ends of the handle bars are insulated from the cross piece 95 by insulator washers 193. Similar insulator washers 194 insulate metal washers 190 on the external ends of the handle bars from the cross piece 95. Nuts 195 threaded onto the external ends of the bars into tight abutment with the metal washers 190 secure the associated elements tightly together. The upper free ends 90 (Figs. 1 and 4) of the handle bars are similarly connected to and insulated from the extension piece 92.

The trolley system 34 (Figs. 1 and 11) includes an electrically powered carriage 197 which is adapted to ride back and forth in a horizontal plane upon track means 198 supported overhead of the work site. The depending arms 73 which support the hanger plates 71 are carried by the carriage. An electrical control panel 199 for supplying the track means and carriage by means of a suitable circuit, not shown, with electrical power for effecting controlled movement of the carriage along the tracks, is mounted upon a tray 196 of the handle bars, whereby the movement of the carriage 197 and as a consequence, a desired movement of the work unit 28 in a horizontal plane over the work site 21 may be effected by the operator. A switch 200 controlling current flow to the trolley system, includes an operating lever 201 which is adapted to be manually pivoted by the operator from a central neutral or stop position progressively to the position F to cause progressive movement of the carriage in a forward direction; and to the position R, to cause progressive return movement of the carriage.

A lateral or transverse movement of the work unit is also possible. The carriage 197 carries a depending transverse channel or track block 202 in which a shoe 203 supported between the upper ends of arms 73 is adapted to easily ride when a lateral force is applied to the handle 35 by the operator.

While an embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art; and it is our intent, therefore, to claim the invention not only as shown and described herein but also in all such forms and modifications as may reasonably be construed to fall within the spirit of the invention and the scope of the appended claims.

What is claimed is:

1. Apparatus for breaking up the crust formation over the molten metal about a central anode in an electrolytic metal extracting cell pot, comprising a crust breaker having a pneumatically powered shank reciprocating axially of its bottom end, an elongated guide shell, means slidably engaging the crust breaker with the shell for movement longitudinally thereon, a piston cylinder mounted to a top end of the shell in longitudinal extension thereof including a pneumatically powered feed piston having a piston rod coupled to the crust breaker for effecting sliding movement of the latter along the shell, a rigid elongated vertical hanger suspendable at its upper end from an overhead support, a swivel having a horizontal pivot axis in the lower end of the hanger, clamp means on the swivel gripping the shell intermediately of the overall length of the shell and piston cylinder so that the piston cylinder, the shell and the crust breaker define a unit pivotable in a vertical plane together with the swivel about said axis, the crust breaker being slidable longitudinally of a front side of the shell and the clamp means engaging a backside thereof, elongated handle means extending rearwardly from the backside of the said unit having an operating end within manual reach of a ground operator and at a predetermined safe distance from the bottom end of the crust breaker so arranged that manual angular actuation of the handle in a vertical plane is translated into a corresponding pivot movement of the said unit, and a combined splash guard and centralizer plate for the shank supported to the said unit having a centralizing collar closely surrounding the lower end of the shank and having a broad flat surface area extending radially from the collar.

2. Apparatus as defined in claim 1, wherein the handle is characterized by an inner end connection fixed to the swivel and by a second lower inner end connection fixed to the backside of the shell near the lower end of the latter, whereby manual angular actuation of the handle downwardly pushes the lower end of the said unit angularly forward and manual actuation of the handle upwardly draws the said lower part of the unit angularly rearward.

3. Apparatus as defined in claim 2, wherein pneumatic pressure supply control means is supported upon the handle, and flexible hose lines connect the control means with the crust breaker and with the cylinder for supplying pneumatic operating power respectively to the shank of the crust breaker and to the feed piston.

4. Apparatus as defined in claim 3, wherein the crust breaker, the shell, the cylinder, and the swivel as a unit tend normally to pivot relative to vertical so as to carry the cylinder angularly rearward, and wherein stop means carried by the swivel is cooperable with fixed stop means carried by the hanger to limit the extent of such pivoting to a predetermined angular position relative to vertical.

5. Apparatus as defined in claim 4, wherein the crust breaker, the shell and the cylinder comprise a unit which is adjustable in a longitudinal direction on the swivel, so as to provide a substantially balanced condition thereof relative to the pivot axis of the swivel, and the weight of the handle overbalancing the said unit so as to carry the cylinder end thereof rearwardly to limit the said unit upon the said stop means, said limited condition being the most active working position for the crust breaker.

6. Apparatus as defined in claim 1, wherein stop means carried by the upper end of the hanger cooperates with the cylinder to limit pivot movement of the said unit to a vertical position in a forward direction, and stop means carried by the lower end of the hanger cooperates with stop means on the swivel to limit pivoting of the said unit to a predetermined angular position in a rearward direction.

7. Apparatus as defined in claim 2, wherein the handle is electrically insulated in its end connections relative to the swivel and to the shell.

8. Apparatus as defined in claim 1, wherein elongated guard means fronts the shank in parallel spaced relation thereto, and means is provided supporting the guard means to the shell, the shank being prevented by the guard means from coming into striking contact with the anode centrally of the cell pot.

9. In apparatus for breaking up the hard crust surface formation about the anode in an electrolytic metal extraction cell pot, a pneumatically powered percussive work unit for acting upon the crust surface, a rigid hanger adapted to be supported above the cell pot, means pivotally supporting the work unit in the hanger for angular movement in a vertical plane relative to the crust surface, a manually operable handle fixed in lateral relation to the work unit for effecting pivoting of the latter on its supporting means, the handle being elongated and having a manually engageable end at a predetermined safe distance for the operator from the work unit and within easy manual reach from the ground level, control means on the handle remote from the work unit for effecting pneumatic operation of the latter, and means electrically insulating the handle in its connection relative to the work unit.

10. In apparatus as defined in claim 9, wherein the work unit has a substantially balanced condition on the said pivotally supporting means, and a drill shank reciprocating axially of its bottom end, and the weight of the handle slightly overbalances the work unit so as to cause the latter to swing from vertical so that its upper end moves in the direction of the operator, and the bottom end moves away from the operator.

11. In apparatus as defined in claim 10, wherein stop means on the hanger cooperates with the handle in limiting the work unit in such directional swinging to a predetermined angular position relative to vertical, said angular position being the normal working position of the work unit.

12. In apparatus for breaking up the hard crust surface that forms about the anode in an electrolytic metal extraction cell pot, including a pneumatically powered work unit for acting upon the crust surface to break up the same, and including a vertically extending rigid hanger; an overhead electrically powered carriage movable upon track means in a horizontal plane above the cell pot, depending means rigidly connecting the hanger to the carriage, means pivotally supporting the work unit in the lower end of the hanger for angular movement in a vertical plane relative to the crust surface and at all times relative to the hanger, handle means extending laterally from the work unit for effecting under direct manual power applied to the handle, pivoting of the work unit in the said supporting means, the handle having an actuating end for application of said manual power by the operator at a predetermined safe distance for the operator relative to the work unit, control panel means mounted upon the handle including electrical switch means manually operable by the operator for effecting controlled electrical movement of the carriage upon its tracks, and pneumatic supply control means supported upon the handle adjacent its actuating end and manually operable by the operator for effecting pneumatic operation of the work unit.

13. In apparatus as defined in claim 12, wherein the work unit includes guard means for guarding the work unit against direct contact with the anode of the cell pot, means electrically insulating the work unit relative to the guard means, and means electrically insulating the handle relative to the work unit.

14. In crust breaking apparatus including a supported overhead hanger, an assembly pivotable in a vertical plane in the hanger comprising a swivel having pivots defining a horizontal axis pivotally mounted in the hanger, an elongated work unit including an elongated guide shell removably mounted to a forward end of the swivel, a pneumatically powered crust breaker mounted upon the shell for longitudinal slidable movement thereon, a pneumatic feed cylinder fixed to the guide shell in longitudinal extension thereof and connected with the crust breaker for effecting longitudinal movement of the latter, and a manually actuable handle extending rearwardly from the swivel, wherein the center of gravity of the assembly is near the horizontal axis and the handle overbalances the assembly so as to cause the latter to pivot rearwardly, a stop on the hanger serving as a limit for such rearward movement and predetermining the normal working position of the crust breaker, and means on the hanger for dampening the vibration of the assembly during operation thereof.

15. In crust breaking apparatus including a crust breaker having a pneumatically powered shank reciprocating axially of its bottom end, and an elongated slide channel supporting the crust breaker for longitudinal sliding movement thereon, a piston cylinder coupled to a top end of the slide channel in axial extension thereof including a pneumatically powered feed piston therein having a direct piston rod connection with the crust breaker for effecting sliding movement of the latter along the slide channel, a hanger adapted to be fixed at its upper end to an elevated support, a swivel having a horizontal pivot axis in the lower end of the hanger, and clamp means fixed to the swivel and gripping the slide channel intermediately of the overall length of the slide channel and of the piston cylinder whereby the slide channel together with the cylinder and the crust breaker are pivotable as a unit together with the swivel about said axis in a vertical plane; wherein the crust breaker moves longitudinally of a front side of the slide channel and the clamp means engages a backside thereof, an elongated handle extends rearwardly relative to the backside of the channel, and the handle is characterized by an inner end connection fixed to the swivel and by a second lower inner end connection fixed to the backside of the slide channel near the lower end of the latter, whereby manual angular actuation of the handle in a vertical plane is translated into a corresponding pivot movement of the said unit; wherein the handle is electrically insulated in its end connections relative to the swivel; wherein elongated guard means fronts the shank in parallel spaced relation thereto, and a pair of anchor members surrounding the shank supports the guard means to the slide channel, the guard means being electrically insulated from the said anchor members; and wherein one of the anchor members is a centralizer for the shank and provides a broad flat surface area surrounding the lower end of the shank and defining a hole through which the shank reciprocates, the centralizer being anchored to the bottom ends respectively of the slide channel and the guard means.

References Cited in the file of this patent

UNITED STATES PATENTS

| | | |
|---|---|---|
| 1,535,411 | Hansen | Apr. 28, 1925 |
| 1,541,392 | Reaney | June 9, 1925 |
| 1,656,546 | Tuttle | Jan. 17, 1928 |
| 2,136,315 | Pettit | Nov. 8, 1938 |
| 2,165,853 | Hart | July 11, 1939 |
| 2,423,787 | Mosena et al. | July 8, 1947 |